US010233396B1

(12) United States Patent
Khankal et al.

(10) Patent No.: US 10,233,396 B1
(45) Date of Patent: Mar. 19, 2019

(54) METHOD OF PRODUCING AROMATIC HYDROCARBONS

(71) Applicant: Chevron Phillips Chemical Company LP, The Woodlands, TX (US)

(72) Inventors: Reza Khankal, Humble, TX (US); Scott G. Morrison, Kingwood, TX (US); Steven D. Bridges, Porter, TX (US); Cameron M. Crager, Mobile, AL (US); Vincent D. McGahee, Kemah, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 15/995,261

(22) Filed: Jun. 1, 2018

(51) Int. Cl.
| | |
|---|---|
| C07C 2/42 | (2006.01) |
| C10G 35/00 | (2006.01) |
| C10G 5/06 | (2006.01) |
| C10G 45/68 | (2006.01) |
| B01D 19/00 | (2006.01) |

(52) U.S. Cl.
CPC ........... *C10G 5/06* (2013.01); *B01D 19/0052* (2013.01); *C10G 45/68* (2013.01); *C10G 2300/4081* (2013.01); *C10G 2400/30* (2013.01)

(58) Field of Classification Search
USPC .................. 585/407, 413, 802, 804; 208/133
See application file for complete search history.

(56) References Cited

U.S. PATENT DOCUMENTS

| | | | |
|---|---|---|---|
| 3,516,924 A | 6/1970 | Forbes | |
| 3,898,153 A * | 8/1975 | Louder | C10G 45/04 208/211 |
| 5,211,838 A | 5/1993 | Staubs et al. | |
| 5,401,386 A | 3/1995 | Morrison et al. | |
| 5,558,767 A | 9/1996 | Ressl | |
| 5,597,404 A | 1/1997 | Domergue et al. | |
| 5,877,367 A | 3/1999 | Witte | |

(Continued)

OTHER PUBLICATIONS

McNaught, Alan D., et al., "Compendium of Chemical Terminology," IUPAC Recommendations, Second edition, 1997, 5 pages, Wiley-Blackwell.

(Continued)

*Primary Examiner* — Thuan D Dang
(74) *Attorney, Agent, or Firm* — Conley Rose, P.C.

(57) ABSTRACT

A method of processing one or more streams in a benzene production system comprising receiving a reactor effluent stream comprising benzene from an aromatization reactor system; introducing reactor effluent stream into a first separator to produce first gas stream and first liquid stream; splitting the first gas stream into first portion and second portion of first gas stream; introducing first portion of first gas stream into a first compressor to produce first compressed gas stream; introducing first compressed gas stream into a second separator to produce recycle gas stream comprising hydrogen and second liquid stream; recycling recycle gas stream to aromatization reactor system; introducing second portion of first gas stream into a second compressor to produce second compressed gas stream; introducing second compressed gas stream into a third separator to produce gas product stream comprising hydrogen and third liquid stream; and optionally recycling gas product stream to aromatization reactor system.

21 Claims, 3 Drawing Sheets

(56) References Cited

U.S. PATENT DOCUMENTS

| | | |
|---|---|---|
| 6,004,452 A | 12/1999 | Ash et al. |
| 6,143,166 A | 11/2000 | Nacamuli |
| 6,812,180 B2 | 11/2004 | Fukunaga |
| 7,153,801 B2 | 12/2006 | Wu |
| 7,932,425 B2 | 4/2011 | Blessing et al. |
| 8,362,310 B2 | 1/2013 | Blessing et al. |
| 8,569,555 B2 | 10/2013 | Blessing et al. |
| 9,085,736 B2 | 7/2015 | Morrison et al. |
| 9,822,316 B2 | 11/2017 | Morrison et al. |
| 2011/0147270 A1 | 6/2011 | Goldstein et al. |
| 2012/0000822 A1 | 1/2012 | Sanchez |
| 2013/0109897 A1 | 5/2013 | Morrison et al. |

OTHER PUBLICATIONS

Clay et al., U.S. Statutory Invention Registration No. US H2244 H published Aug. 3, 2010.

\* cited by examiner

METHOD OF PRODUCING AROMATIC HYDROCARBONS

TECHNICAL FIELD

The present disclosure generally relates to the production of aromatic hydrocarbons. More specifically, this disclosure relates to a process for benzene production.

BACKGROUND

The catalytic conversion of hydrocarbons into aromatic compounds, referred to as aromatization or reforming, is an important industrial process. The aromatization reactions can include dehydrogenation, isomerization, and hydrocracking the hydrocarbons, each of which produces specific aromatic compounds. Generally, these reactions also produce hydrogen, and are conducted in one or more aromatization reactors containing an aromatization catalyst. However, a certain amount of hydrogen has to be introduced to the aromatization reactors to avoid coke formation, which could damage the aromatization catalyst. In order to offset some of the costs and maximize production, it can be useful to reclaim and/or recycle some of the hydrogen recovered in the aromatization reactor effluents. Thus, there is an ongoing need for developing efficient processes for the recovery of hydrogen containing gaseous streams during the production of aromatic compounds.

BRIEF SUMMARY

Disclosed herein is a method of processing one or more streams in a benzene production system, the method comprising (a) receiving a reactor effluent stream from an aromatization reactor system, wherein the reactor effluent comprises benzene; (b) introducing at least a portion of the reactor effluent stream into a first separator to produce a first gas stream and a first liquid stream; (c) splitting the first gas stream into a first portion of the first gas stream and a second portion of the first gas stream; (d) introducing the first portion of the first gas stream into a first compressor to produce a first compressed gas stream; (e) introducing at least a portion of the first compressed gas stream into a second separator to produce a recycle gas stream and a second liquid stream, wherein the recycle gas stream comprises hydrogen; (f) recycling at least a portion of the recycle gas stream to the aromatization reactor system; (g) introducing the second portion of the first gas stream into a second compressor to produce a second compressed gas stream; (h) introducing at least a portion of the second compressed gas stream into a third separator to produce a gas product stream and a third liquid stream, wherein the gas product stream comprises hydrogen; and (i) optionally recycling a portion of the gas product stream to the aromatization reactor system.

Also disclosed herein is a method of processing one or more streams in a benzene production system, the method comprising (a) receiving a reactor effluent stream from an aromatization reactor system, wherein the reactor effluent comprises benzene; (b) introducing at least a portion of the reactor effluent stream into a first separator to produce a first gas stream and a first liquid stream; (c) splitting the first gas stream into a first portion of the first gas stream and a second portion of the first gas stream; (d) introducing the first portion of the first gas stream into a first compressor to produce a first compressed gas stream; (e) introducing at least a portion of the first compressed gas stream into a second separator to produce a recycle gas stream and a second liquid stream; (f) recycling at least a portion of the recycle gas stream to the aromatization reactor system; (g) introducing the second portion of the first gas stream into a second compressor to produce a second compressed gas stream; (h) introducing at least a portion of the second compressed gas stream into a third separator to produce a third gas stream and a third liquid stream; (i) introducing at least a portion of the third gas stream into a third compressor to produce a third compressed gas stream; (j) introducing at least a portion of the third compressed gas stream into a fourth separator to produce a purified gas product stream and a fourth liquid stream, wherein the purified gas product stream comprises hydrogen; (k) splitting the purified gas product stream into a first portion of the purified gas product stream and a second portion of the purified gas product stream; and (l) optionally recycling at least a portion of the first portion of the purified gas product stream to the aromatization reactor system.

Further disclosed herein is a method of processing one or more streams in a benzene production system, the method comprising (a) receiving a reactor effluent stream from an aromatization reactor system, wherein the reactor effluent comprises benzene; (b) introducing at least a portion of the reactor effluent stream into a first separator to produce a first gas stream and a first liquid stream; (c) splitting the first gas stream into a first portion of the first gas stream and a second portion of the first gas stream; (d) introducing the first portion of the first gas stream into a first compressor to produce a first compressed gas stream; (e) introducing the second portion of the first gas stream into a second compressor to produce a second compressed gas stream; (f) introducing at least a portion of the first compressed gas stream and/or at least a portion of the second compressed gas stream into a second separator to produce a second gas stream and a second liquid stream, wherein the second gas stream comprises hydrogen; and (g) recycling a portion of the second gas stream to the aromatization reactor system.

BRIEF DESCRIPTION OF THE DRAWINGS

For a detailed description of the disclosed processes and systems, reference will now be made to the accompanying drawings in which.

DETAILED DESCRIPTION

It should be understood at the outset that although an illustrative implementation of one or more embodiments are provided below, the disclosed systems, methods, or both can be implemented using any number of techniques, whether currently known or in existence. The disclosure should in no way be limited to the illustrative implementations, drawings, and techniques illustrated below, including the exemplary designs and implementations illustrated and described herein, but can be modified within the scope of the appended claims along with their full scope of equivalents.

Disclosed herein are systems, apparatuses, and processes related to petrochemical production processes, for example the production of aromatic compounds, such as benzene. The systems, apparatuses, and processes are generally related to the separation of gaseous streams (e.g., hydrogen containing gas streams) from liquid streams (e.g., benzene containing liquid streams) resulting from petrochemical production processes, for example the production of benzene.

As disclosed herein, a method of processing one or more streams in a benzene production system can generally comprise the steps of (a) receiving a reactor effluent stream from an aromatization reactor, wherein the aromatization reactor is part of an aromatization reactor system, wherein the aromatization reactor system is part of the benzene production system, and wherein the reactor effluent comprises benzene; (b) introducing at least a portion of the reactor effluent stream into a first separator to produce a first gas stream and a first liquid stream; (c) splitting the first gas stream into a first portion of the first gas stream and a second portion of the first gas stream; (d) introducing the first portion of the first gas stream into a first compressor to produce a first compressed gas stream; (e) introducing at least a portion of the first compressed gas stream into a second separator to produce a recycle gas stream and a second liquid stream, wherein the recycle gas stream comprises hydrogen; (f) recycling at least a portion of the recycle gas stream to the aromatization reactor system; (g) introducing the second portion of the first gas stream into a second compressor to produce a second compressed gas stream; (h) introducing at least a portion of the second compressed gas stream into a third separator to produce a gas product stream and a third liquid stream, wherein the gas product stream comprises hydrogen; and (i) optionally recycling a portion of the gas product stream to the aromatization reactor system, wherein the gas product stream comprises hydrogen. The method can further comprise (i) introducing at least a portion of the gas product stream (e.g., third gas stream) into a third compressor to produce a third compressed gas stream; (ii) introducing at least a portion of the third compressed gas stream into a fourth separator to produce a purified gas product stream and a fourth liquid stream, wherein the purified gas product stream comprises hydrogen; (iii) splitting the purified gas product stream into a first portion of the purified gas product stream and a second portion of the purified gas product stream; and (iv) optionally recycling at least a portion of the first portion of the purified gas product stream to the aromatization reactor system.

As disclosed herein, a method of processing one or more streams in a benzene production system can generally comprise separating gas streams (e.g., recycle gas stream, gas product stream, purified gas product stream) containing hydrogen from a reactor effluent stream, wherein the reactor effluent can be recovered from an aromatic compound production process. While the present disclosure will be discussed in detail in the context of a process for separating gas streams containing hydrogen from a reactor effluent stream in a benzene production process, it should be understood that such process or any steps thereof can be applied in any suitable petrochemical production process requiring separating gas streams containing hydrogen from a reactor effluent stream. The reactor effluent stream and separated gas streams can comprise any suitable streams compatible with the disclosed methods and materials.

The following definitions are provided in order to aid those skilled in the art in understanding the detailed description of the present invention. Unless otherwise defined herein, scientific and technical terms used in connection with the present invention shall have the meanings that are commonly understood by those of ordinary skill in the art to which this invention belongs. Further, unless otherwise required by context, singular terms shall include pluralities and plural terms shall include the singular.

Unless explicitly stated otherwise in defined circumstances, all percentages, parts, ratios, and like amounts used herein are defined by weight.

Further, certain features of the present invention which are, for clarity, described herein in the context of separate embodiments, may also be provided in combination in a single embodiment. Conversely, various features of the invention that are, for brevity, described in the context of a single embodiment, may also be provided separately or in any sub-combination.

If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising," which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claim. A "consisting essentially of" claim occupies a middle ground between closed claims that are written in a "consisting of" format and fully open claims that are drafted in a "comprising" format. Absent an indication to the contrary, describing a compound or composition as "consisting essentially of" is not to be construed as "comprising," but is intended to describe the recited component that includes materials which do not significantly alter the composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of apply only to the feature class to which it is utilized, and it is possible to have different transitional terms or phrases utilized with different features within a claim. For example, a method can comprise several recited steps (and other non-recited steps), but utilize a catalyst system consisting of specific components; alternatively, consisting essentially of specific components; or alternatively, comprising the specific components and other non-recited components.

In this disclosure, while systems, processes, and methods are often described in terms of "comprising" various components, devices, or steps, the systems, processes, and methods can also "consist essentially of" or "consist of" the various components, devices, or steps, unless stated otherwise.

The term "about" as used herein means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" may mean within 10% of the reported numerical value, preferably within 5% of the reported numerical value.

Although any methods, devices, and materials similar or equivalent to those described herein can be used in the practice or testing of the invention, the typical methods, devices, and materials are herein described.

Figure 1:
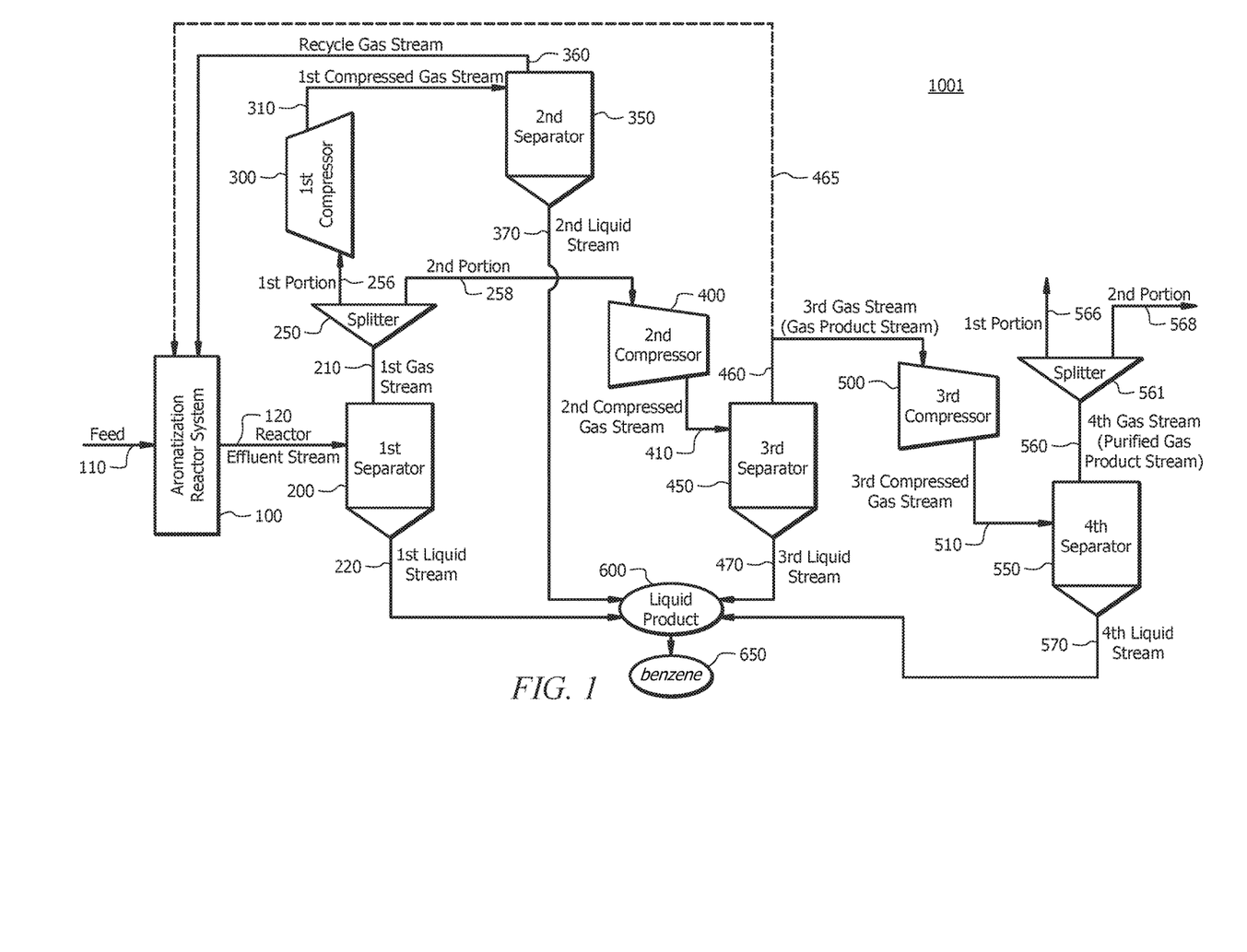
FIG. 1 illustrates a schematic of a benzene production system 1001.

Referring to FIG. 1, a benzene production system 1001 is disclosed. Benzene production system 1001 generally comprises an aromatization reactor system 100, a first separator 200, a gas splitter 250, a first compressor 300, a second separator 350, a second compressor 400, a third separator 450, a third compressor 500, a fourth separator 550, and a gas splitter 561.

Figure 2:
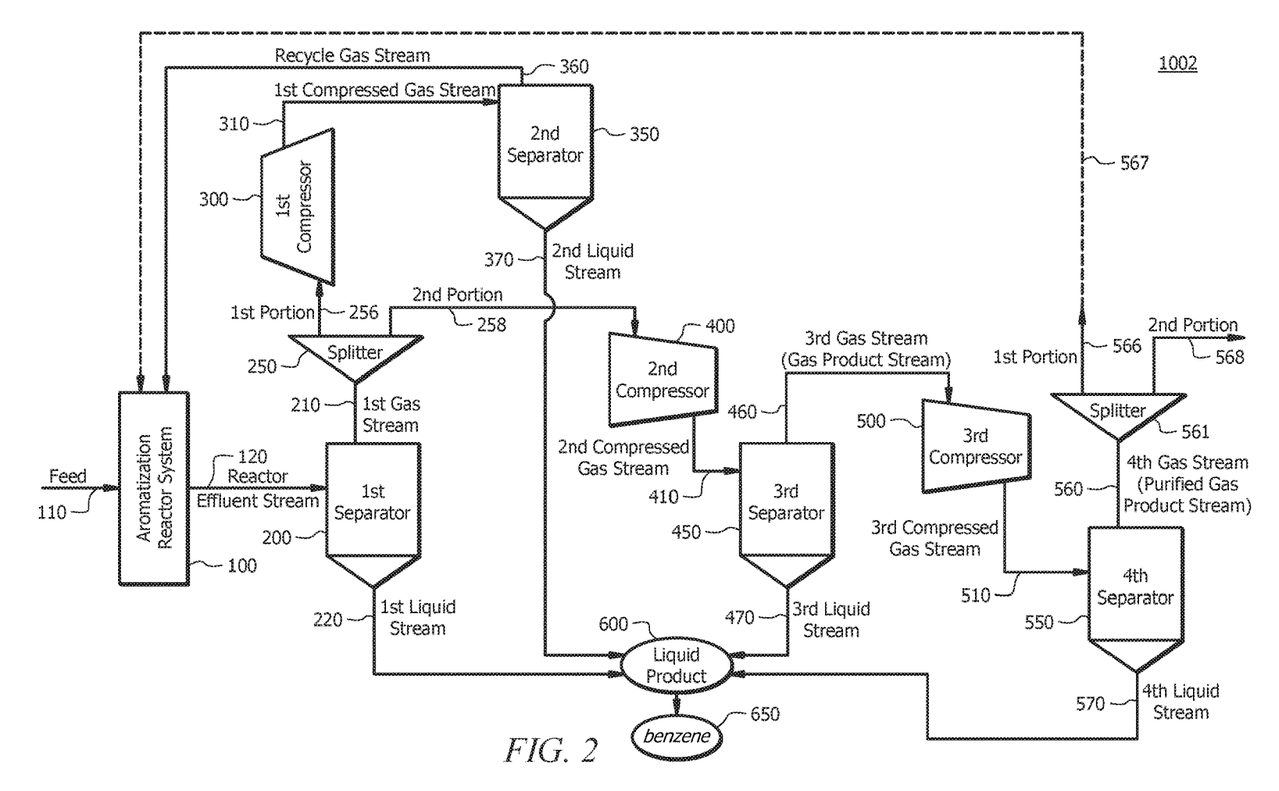
FIG. 2 illustrates a schematic of a benzene production system 1002.

Referring to FIG. 2, a benzene production system 1002 is disclosed. Benzene production system 1002 generally comprises an aromatization reactor system 100, a first separator 200, a gas splitter 250, a first compressor 300, a second separator 350, a second compressor 400, a third separator 450, a third compressor 500, a fourth separator 550, and a gas splitter 561.

Figure 3:
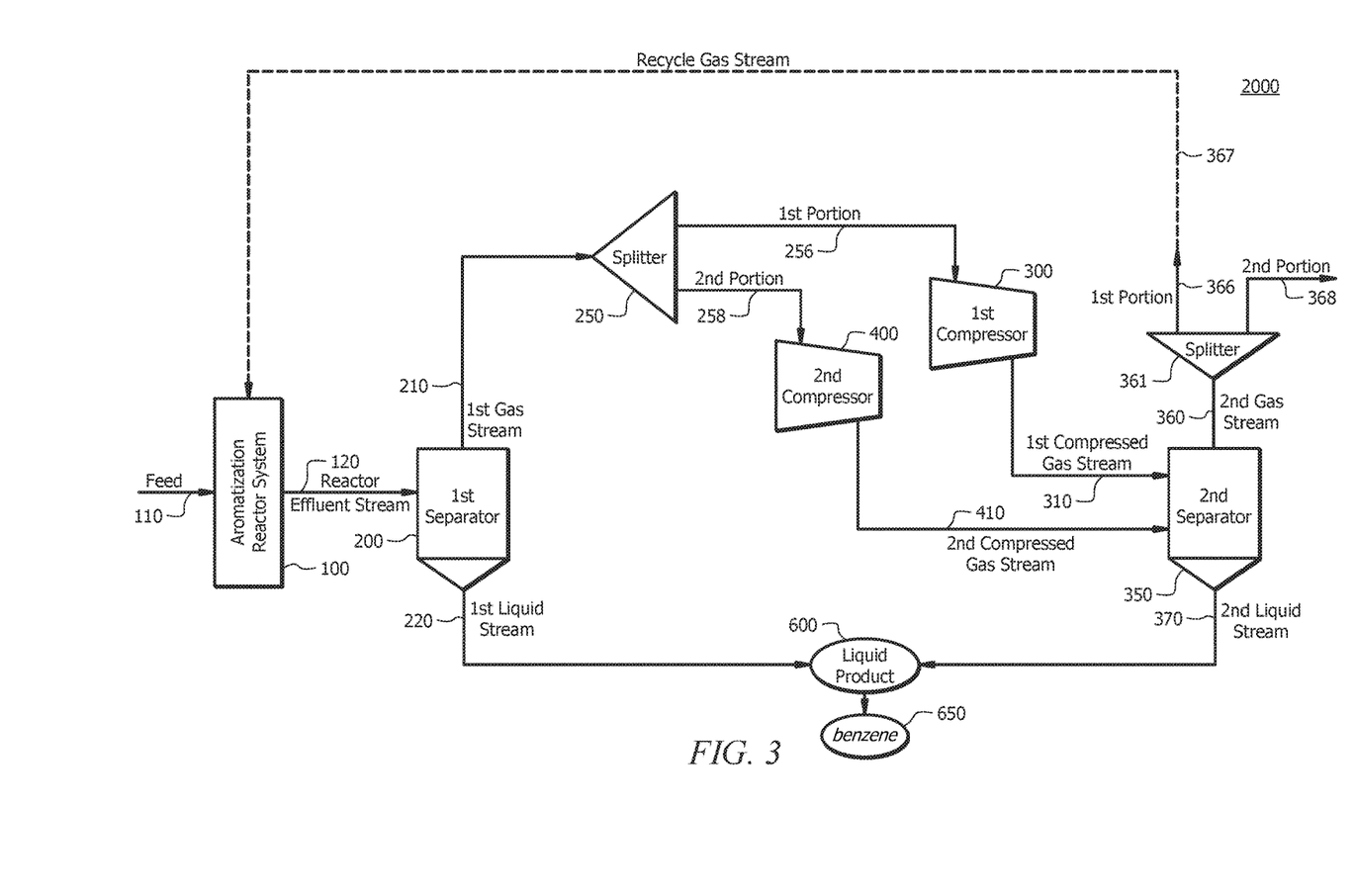
FIG. 3 illustrates a schematic of benzene production system 2000.

Referring to FIG. 3, a benzene production system 2000 is disclosed. Benzene production system 2000 generally comprises an aromatization reactor system 100, a first separator 200, a gas splitter 250, a first compressor 300, a second separator 350, a second compressor 400, and a gas splitter 361.

In the benzene production systems disclosed herein, various system components can be in fluid communication via one or more conduits (e.g., pipes, tubing, flow lines, etc.) suitable for the conveyance of a particular stream, for example as shown in detail by the numbered streams in FIGS. 1, 2, and 3.

Aromatization reactor system 100 can comprise one or more aromatization reactors. When two or more aromatization reactors are used, the reactors can be arranged in series or in parallel. Aromatization reactor system 100 can comprise any suitable number and configuration of aromatization reactors, for example one, two, three, four, five, six, or more reactors in series or in parallel. As aromatization reactions are highly endothermic, large temperature drops occur across the aromatization reactors. Therefore, each aromatization reactor can comprise a corresponding furnace for heating feed stream components to a desired temperature for maintaining a desired reaction rate. Alternatively, one or more aromatization reactors can share a common furnace where practical.

A feed stream 110 (e.g., hydrocarbon feed) can be introduced to aromatization reactor system 100. Feed stream 110 can be fed into a purification process prior to introducing the feed stream to an aromatization reactor. The purification process can employ any suitable known process(es) to purify the hydrocarbon feed, which can include fractionation and/or treating the hydrocarbon feed. As used herein, the term "fractionation" includes removing heavy (e.g., $C_9^+$) hydrocarbons and/or light (e.g., $C_5^-$) hydrocarbons. As used herein, the terms "treating" and "removing" refer interchangeably to removing impurities, such as oxygenates, sulfur, and/or metals, from the hydrocarbon feed. The resulting purified feed stream can be combined with a hydrogen recycle stream (e.g., recycle gas stream 360 and/or gas product stream 465 in FIG. 1; recycle gas stream 360 and/or a portion 567 of purified gas product stream 560 in FIG. 2; a portion 367 of recycle gas stream 360 in FIG. 3) to produce a reactor feed stream, as will be described in more detail later herein.

The reactor feed stream can be pre-heated in a furnace (e.g., a first furnace), which heats the hydrocarbons to a desired temperature, thereby producing a reactor feed stream having a desired temperature, and then introduced to an aromatization reactor (e.g., a first aromatization reactor). The aromatization reactor can comprise an aromatization catalyst, wherein the hydrocarbons in the reactor feed stream can be contacted with the aromatization catalyst under suitable reaction conditions (e.g., temperature and pressure) that aromatize one or more components in the feed, thereby increasing the aromatics content thereof. A reactor effluent (e.g., first reactor effluent) comprising aromatics (e.g., aromatic compounds, benzene), unreacted feed, and other hydrocarbon compounds or byproducts can be recovered from the aromatization reactor.

In some aspects, the reactor effluent can be further introduced to a second furnace which heats the hydrocarbons to a desired temperature thereby producing a reactor feed stream having a desired temperature, which is then introduced to a second aromatization reactor. The second aromatization reactor can comprise an aromatization catalyst, wherein the hydrocarbons in the reactor feed stream can be contacted with the aromatization catalyst under suitable reaction conditions (e.g., temperature and pressure) that aromatize one or more components in the feed, thereby increasing the aromatics content thereof. A second reactor effluent comprising aromatics, unreacted feed, and other hydrocarbon compounds or byproducts can be recovered from the aromatization reactor. As will be appreciated by one of skill in the art, and with the help of this disclosure, a reactor effluent (e.g., a first reactor effluent, a second reactor effluent, etc.) can be further heated in a furnace and introduced to a subsequent aromatization reactor as necessary to produce a reactor effluent having a desired aromatics content.

Aromatization reactor system 100 disclosed herein can comprise a fixed catalyst bed system, a moving catalyst bed system, a fluidized catalyst bed system, or combinations thereof. Such reactor systems can be batch or continuous. In an aspect, the aromatization reactor system is a fixed bed system comprising one or more fixed bed reactors. In a fixed bed system, the feed can be preheated in furnace tubes and passed into at least one reactor that contains a fixed bed of the catalyst. The flow of the feed can be upward, downward, or radially through the reactor. The aromatization reactor system described herein can be operated as an adiabatic aromatization reactor system or an isothermal aromatization reactor system. As used herein, the terms "aromatization reactor" and "reactor" refer interchangeably to a reactor vessel, reactor internals, and associated processing equipment, including but not limited to the catalyst, inert packing materials, scallops, flow distributors, center pipes, reactor ports, catalyst transfer and distribution system, furnaces and other heating devices, heat transfer equipment, and piping.

Aromatization reactor system 100 can be an aromatization reactor system comprising at least one aromatization reactor and its corresponding processing equipment. As used herein, the terms "aromatization," "aromatizing," and "reforming" refer to the treatment of a hydrocarbon feed to provide an aromatics enriched product, which can be a product whose aromatics content is greater than that of the feed. Typically, one or more components of the feed undergo one or more reforming reactions to produce aromatics. Some of the hydrocarbon reactions that occur during the aromatization operation include the dehydrogenation of cyclohexanes to aromatics, dehydroisomerization of alkylcyclopentanes to aromatics, dehydrocyclization of acyclic hydrocarbons to aromatics, or combinations thereof. A number of other reactions also occur, including the dealkylation of alkylbenzenes, isomerization of paraffins, hydrocracking reactions that produce light gaseous hydrocarbons, e.g., methane, ethane, propane and butane, or combinations thereof.

The aromatization reaction(s) occurs under process conditions that thermodynamically favor the dehydrocyclization reaction(s) and limit undesirable hydrocracking reactions. The pressures can be from about 0 pounds per square inch gauge (psig) to about 500 psig (3,447 kPag), or alternatively from about 25 psig (172 kPag) to about 300 psig (2,068 kPag). The molar ratio of hydrogen-to-hydrocarbons can be from about 0.1:1 to about 20:1, or alternatively from about 1:1 to about 6:1. The operating temperatures include reactor inlet temperatures from about 700° F. (371° C.) to about 1,050° F. (566° C.), or alternatively from about 900° F. (482° C.) to about 1,000° F. (538° C.). Finally, the liquid hourly space velocity (LHSV) for the hydrocarbon feed over the aromatization catalyst can be from about 0.1 to about 10 $hr^{-1}$, or alternatively from about 0.5 to about 2.5 $hr^{-1}$.

The composition of feed stream 110 is a consideration when designing aromatization reactor systems such as aromatization reactor system 100. In an aspect, the hydrocarbon feed comprises non-aromatic hydrocarbons containing at least six carbon atoms. The feed to the aromatization system is a mixture of hydrocarbons comprising $C_6$ to $C_8$ hydrocarbons containing up to about 10 wt. % and alternatively up to about 15 wt. % of $C_5$ and lighter hydrocarbons ($C_5^-$) and containing up to about 10 wt. % of $C_9$ and heavier hydrocarbons ($C_9^+$). Such low levels of $C_9$+ and $C_5^-$ hydrocarbons maximize the yield of high value aromatics. In some aspects, an optimal hydrocarbon feed maximizes the percentage of $C_6$ hydrocarbons. Such a feed can be achieved by separating a hydrocarbon feedstock such as a full range naphtha into a light hydrocarbon feed fraction and a heavy hydrocarbon feed fraction, and using the light fraction.

Feed stream 110 can be a naphtha feed. The naphtha feed can be a light hydrocarbon fraction, with a boiling range of about 70° F. (21° C.) to about 450° F. (232° C.). The naphtha feed can contain aliphatic, naphthenic, or paraffinic hydrocarbons. These aliphatic and naphthenic hydrocarbons are converted, at least in part, into aromatics in the aromatization reactor system. While catalytic aromatization typically refers to the conversion of naphtha, other feedstocks can be treated as well to provide an aromatics enriched product. Therefore, while the conversion of naphtha is one possibility, the present disclosure can be useful for activating catalysts for the conversion or aromatization of a variety of feedstocks such as paraffin hydrocarbons, olefin hydrocarbons, acetylene hydrocarbons, cyclic paraffin hydrocarbons, cyclic olefin hydrocarbons, and mixtures thereof, and particularly saturated hydrocarbons.

Feed stream 110 can be substantially free of sulfur, metals, and other known poisons for aromatization catalysts. If present, such poisons can be removed using methods known to those skilled in the art. In some aspects, the feed can be purified by using conventional hydrofining techniques, followed by using sorbents to remove any remaining poisons.

Various types of aromatization catalysts can be used with aromatization reactor system 100 described herein. The aromatization catalyst can be a non-acidic catalyst that comprises a non-acidic zeolite support, a group VIII metal, and one or more halides. Suitable halides include chloride, fluoride, bromide, iodide, or combinations thereof. Suitable Group VIII metals include iron, cobalt, nickel, ruthenium, rhodium, palladium, osmium, iridium, and platinum. Examples of aromatization catalysts suitable for use with aromatization reactor system 100 described herein are the AROMAX® Catalyst brand of catalysts available from the Chevron Phillips Chemical Company of The Woodlands, Tex. and those discussed in U.S. Pat. Nos. 6,812,180; and 7,153,801; each of which is incorporated by reference herein in its entirety.

Supports for aromatization catalysts can generally include any inorganic oxide. These inorganic oxides include bound large pore aluminosilicates (zeolites), amorphous inorganic oxides and mixtures thereof. Large pore aluminosilicates include, but are not limited to, L-zeolite, Y-zeolite, mordenite, omega zeolite, beta zeolite and the like. Amorphous inorganic oxides include, but are not limited to, aluminum oxide, silicon oxide, and titania. Suitable bonding agents for the inorganic oxides include, but are not limited to, silica, alumina, clays, titania, and magnesium oxide.

Zeolite materials, both natural and synthetic, are known to have catalytic properties for many hydrocarbon processes. Zeolites typically are ordered porous crystalline aluminosilicates having a structure with cavities and channels interconnected by channels. The cavities and channels throughout the crystalline material generally can be of a size to allow selective separation of hydrocarbons.

The term "zeolite" generally refers to a particular group of hydrated, crystalline metal aluminosilicates. These zeolites exhibit a network of $SiO_4$ and $AlO_4$ tetrahedra in which aluminum and silicon atoms are crosslinked in a three-dimensional framework by sharing oxygen atoms. In the framework, the ratio of oxygen atoms to the total of aluminum and silicon atoms can be equal to 2. The framework exhibits a negative electrovalence that typically is balanced by the inclusion of cations within the crystal such as metals, alkali metals, alkaline earth metals, or hydrogen.

L-type zeolite catalysts are a sub-group of zeolitic catalysts. Typical L-type zeolites contain mole ratios of oxides in accordance with the following formula:

$$M_{2/n}O \cdot Al_2O_3 \cdot xSiO_2 \cdot yH_2O$$

wherein "M" designates at least one exchangeable cation such as barium, calcium, cerium, lithium, magnesium, potassium, sodium, strontium, and zinc as well as non-metallic cations like hydronium and ammonium ions which can be replaced by other exchangeable cations without causing a substantial alteration of the basic crystal structure of the L-type zeolite. The "n" in the formula represents the valence of "M", "x" is 2 or greater; and "y" is the number of water molecules contained in the channels or interconnected voids with the zeolite.

Bound potassium L-type zeolites, or KL zeolites, have been found to be particularly desirable as aromatization catalysts. The term "KL zeolite" as used herein refers to L-type zeolites in which the principal cation M incorporated in the zeolite is potassium. A KL zeolite can be cation-exchanged or impregnated with another metal and one or more halides to produce a platinum-impregnated, halided zeolite or a KL supported Pt-halide zeolite catalyst.

The Group VIII metal can be platinum. The platinum and optionally one or more halides can be added to the zeolite support by any suitable method, for example via impregnation with a solution of a platinum-containing compound and one or more halide-containing compounds. For example, the platinum-containing compound can be any decomposable platinum-containing compound. Examples of such compounds include, but are not limited to, ammonium tetrachloroplatinate, chloroplatinic acid, diammineplatinum (II) nitrite, bis-(ethylenediamine)platinum (II) chloride, platinum (II) acetylacetonate, dichlorodiammine platinum, platinum (II) chloride, tetraammineplatinum (II) hydroxide, tetraammineplatinum chloride, and tetraammineplatinum (II) nitrate.

The aromatization catalyst can be a large pore zeolite support with a platinum-containing compound and at least one organic ammonium halide compound. The organic ammonium halide compound can comprise one or more compounds represented by the formula $N(R)_4X$, where X is a halide and where R represents a hydrogen or a substituted or unsubstituted carbon chain molecule having 1-20 carbons wherein each R can be the same or different. In an aspect, R is selected from the group consisting of methyl, ethyl, propyl, butyl, and combinations thereof, more specifically methyl. Examples of suitable organic ammonium compound is represented by the formula $N(R)_4X$ include ammonium chloride, ammonium fluoride, and tetraalkylammonium halides such as tetramethylammonium chloride, tetramethylammonium fluoride, tetraethylammonium chloride, tetraethylammonium fluoride, tetrapropylammonium chloride, tetrapropylammonium fluoride, tetrabutylammonium chloride, tetrabutylammonium fluoride, methyltriethylammonium chloride, methyltriethylammonium fluoride, and combinations thereof.

The organic ammonium halide compound can comprise at least one acid halide and at least one ammonium hydroxide represented by the formula $N(R')_4OH$, where R' is hydrogen or a substituted or unsubstituted carbon chain molecule having 1-20 carbon atoms wherein each R' can be the same or different. In an aspect, R' can be selected from the group consisting of methyl, ethyl, propyl, butyl, and combinations thereof, more specifically methyl. Examples of suitable ammonium hydroxide represented by the formula $N(R')_4OH$ include ammonium hydroxide, tetraalkylammonium hydroxides such as tetramethylammonium hydroxide, tetraethylammonium hydroxide, tetrapropylammonium hydroxide, tetrabutylammonium hydroxide, and combinations thereof. Examples of suitable acid halides include HCl, HF, HBr, HI, or combinations thereof.

In some aspects, the organic ammonium halide compound can comprise (a) a compound represented by the formula $N(R)_4X$, where X is a halide and where R represents a hydrogen or a substituted or unsubstituted carbon chain molecule having 1-20 carbons wherein each R can be the same or different and (b) at least one acid halide and at least one ammonium hydroxide represented by the formula $N(R')_4OH$, where R' is hydrogen or a substituted or unsubstituted carbon chain molecule having 1-20 carbon atoms wherein each R' can be the same or different.

The halide-containing compound can further comprise an ammonium halide such as ammonium chloride, ammonium fluoride, or both in various combinations with the organic ammonium halide compounds described previously. More specifically, ammonium chloride, ammonium fluoride, or both can be used with (a) as described previously, a compound represented by the formula $N(R)_4X$, where X is a halide and where R represents a hydrogen or a substituted or unsubstituted carbon chain molecule having 1-20 carbons wherein each R can be the same or different and/or (b) as described previously, at least one acid halide and at least one organic ammonium hydroxide represented by the formula $N(R')_4OH$, where R' is a substituted or unsubstituted carbon chain molecule having 1-20 carbon atoms wherein each R' can be the same or different. For example, a first fluoride- or chloride-containing compound can be introduced as a tetraalkylammonium halide with a second fluoride- or chloride-containing compound introduced as an ammonium halide. In an aspect, tetraalkylammonium chloride is used with ammonium fluoride.

The method of processing one or more streams in a benzene production system, such as benzene production system 1001 as illustrated in FIG. 1, can comprise receiving reactor effluent stream 120 (e.g., first reactor effluent, second reactor effluent, etc.) from an aromatization reactor, wherein the aromatization reactor is part of aromatization reactor system 100, and wherein the reactor effluent comprises benzene. The reactor effluent can comprise benzene in an amount of equal to or greater than about 1 wt. %, alternatively equal to or greater than about 5 wt. %, or alternatively equal to or greater than about 10 wt. %, based on the total weight of the reactor effluent.

As illustrated in the figures, at least a portion of reactor effluent stream 120 can be introduced into first separator 200 to produce first gas stream 210 and first liquid stream 220. First liquid stream 220 can comprise aromatization reaction products (e.g., aromatic compounds such as benzene, and non-aromatic compounds) from aromatization reactors of aromatization reactor system 100, in addition to any unreacted feed and other hydrocarbon compounds or byproducts. First liquid stream 220 can be further sent to a purification-extraction process for enhancing the benzene content, as will be described in more detail later herein. Hydrogen-containing gas stream separation processes and the purification-extraction processes for benzene are well known in the art and are described in numerous patents, including U.S. Pat. Nos. 5,401,386; 5,877,367; and 6,004,452; each of which is incorporated by reference herein in its entirety.

Reactor effluent stream 120 can be optionally cooled to produce a cooled reactor effluent stream prior to introducing the stream into first separator 200. Cooling the reactor effluent stream can promote the condensation of aromatic hydrocarbons and enable subsequent removal of aromatic hydrocarbons from the reactor effluent stream. As will be appreciated by one of skill in the art, and with the help of this disclosure, the composition of the reactor effluent stream is not affected by cooling it, and as such the composition of the cooled reactor effluent stream is the same as the composition of the reactor effluent stream, although some of the components (e.g., aromatic hydrocarbons) might change the phase they are present in, for example a component might change from a gas phase in the reactor effluent stream to a vapor or liquid phase in the cooled reactor effluent stream. Reactor effluent stream 120 can be optionally cooled in any suitable heat exchange unit that can lower the temperature of the reactor effluent stream as necessary to promote the condensation of the aromatic hydrocarbons in reactor effluent stream 120.

First separator 200 can comprise any suitable vapor-liquid separator that can separate condensed aromatic hydrocarbons from reactor effluent stream 120, the cooled reactor effluent stream, or both. Nonlimiting examples of vapor-liquid separators suitable for use in the present disclosure include gravity separators, centrifugal separators, filter vane separators, mist eliminator pads, liquid/gas coalescers, flash drums, knock-out drums, and the like, or combinations thereof. First separator 200 can comprise impingement barriers (e.g., mist eliminator pads, plates, mesh screen, grating) that can use inertial impaction to separate condensed hydrocarbons from a gas stream. A separator feed stream (e.g., reactor effluent stream 120, cooled reactor effluent stream, or both) can follow a tortuous path around these impingement barriers, while liquid droplets (e.g., hydrocarbon liquid droplets) tend to go in straighter paths, impacting these impingement barriers, thereby losing velocity, coalescing, or both, which eventually leads to the liquid droplets falling to a bottom of a separation vessel, such as first separator 200. First separator 200 can operate at a pressure of from about 0 psig to about 100 psig (689 kPag), alternatively from about 10 psig (69 kPag) to about 90 psig (621 kPag), or alternatively from about 25 psig (172 kPag) to about 75 psig (517 kPag).

First gas stream 210 can be collected as an overhead stream at a top of first separator 200. First gas stream 210 can comprise hydrogen in an amount of equal to or greater than about 1 mol %, alternatively equal to or greater than about 5 mol %, or alternatively equal to or greater than about 10 mol %.

First liquid stream 220 can be collected as a bottoms stream at a bottom of first separator 200. First liquid stream 220 can comprise benzene in an amount of equal to or greater than about 1 mol %, alternatively equal to or greater than about 5 mol %, or alternatively equal to or greater than about 10 mol %.

At least a portion of first gas stream 210 can be introduced to gas splitter 250 to produce a first portion 256 of the first gas stream and a second portion 258 of the first gas stream. Gas splitter 250 can comprise any suitable gas splitter, such as for example a gas splitter valve. First portion 256 of the first gas stream can comprise from about 0% to about 100%, alternatively from about 10% to about 90%, or alternatively from about 25% to about 75% of first gas stream 210. Second portion 258 of the first gas stream can comprise from about 0% to about 100%, alternatively from about 10% to about 90%, or alternatively from about 25% to about 75% of first gas stream 210. As will be appreciated by one of skill in the art, and with the help of this disclosure, a sum of first portion 256 of the first gas stream and second portion 258 of the first gas stream is 100% of first gas stream 210.

The method of processing one or more streams in a benzene production system, such as benzene production systems as illustrated in the figures, can comprise introducing first portion 256 of the first gas stream into a first compressor 300 to produce a first compressed gas stream 310.

First compressor 300 can comprise any suitable gas compressor that can increase the pressure of first portion 256 of the first gas stream as required by the process. Generally, a gas compressor is a mechanical device that can increase the pressure of a gas by reducing its volume. Nonlimiting examples of gas compressors suitable for use in the present disclosure include a screw compressor, a rotary-screw compressor, an oil-free rotary-screw compressor, an oil-injected rotary-screw compressor, a centrifugal compressor, a reciprocating compressor, an axial-flow compressor, and the like, or combinations thereof.

First gas stream 210 can be characterized by a pressure of from about 0 psig to about 100 psig (689 kPag), alternatively from about 10 psig (69 kPag) to about 90 psig (621 kPag), or alternatively from about 25 psig (172 kPag) to about 75 psig (517 kPag). First compressed gas stream 310 emitted from first compressor 300 can be characterized by a pressure of from about 20 psig (138 kPag) to about 200 psig (138 kPag), alternatively from about 25 psig (172 kPag) to about 175 psig (1207 kPag), or alternatively from about 50 psig (345 kPag) to about 150 psig (1,034 kPag). As will be appreciated by one of skill in the art, and with the help of this disclosure, the composition of the first gas stream is not affected by compressing it, and as such the composition of the first compressed gas stream is the same as the composition of the first gas stream (e.g., first portion 256 of the first gas stream). Further, as will be appreciated by one of skill in the art, and with the help of this disclosure, compressing first portion 256 of the first gas stream enables the aromatic hydrocarbons in first portion 256 of the first gas stream to condense at a higher temperature than without the compressing step, which means that a subsequent cooling step will have to cool the compressed gas less to achieve hydrocarbon condensation. Furthermore, as will be appreciated by one of skill in the art, and with the help of this disclosure, the pressure drop across splitter 250 is negligible, and as such the pressure of first portion 256 of the first gas stream or the pressure of second portion of 258 of the first gas stream is about the same as the pressure of first gas stream 210.

The method of processing one or more streams in a benzene production system, such as benzene production systems as illustrated in the figures, can comprise introducing at least a portion of first compressed gas stream 310 into a second separator 350 to produce a recycle gas stream 360 and a second liquid stream 370, wherein recycle gas stream 360 comprises hydrogen, and wherein second liquid stream 370 comprises benzene.

Second liquid stream 370 can comprise aromatization reaction products (e.g., aromatic compounds such as benzene, and non-aromatic compounds), in addition to any unreacted feed and other hydrocarbon compounds or byproducts. Second liquid stream 370 can be further sent to a purification-extraction process for enhancing the benzene content, as will be described in more detail later herein.

First compressed gas stream 310 can be optionally cooled to produce a cooled first compressed gas stream prior to introducing into second separator 350. Cooling the first compressed gas stream can promote the condensation of aromatic hydrocarbons and enable subsequent removal of aromatic hydrocarbons from the first compressed gas stream. As will be appreciated by one of skill in the art, and with the help of this disclosure, the composition of the first compressed gas stream is not affected by cooling it, and as such the composition of the cooled first compressed gas stream is the same as the composition of the first compressed gas stream, although some of the components (e.g., aromatic hydrocarbons) might change the phase they are present in, for example a component might change from a gas phase in the first compressed gas stream to a vapor or liquid phase in the cooled first compressed gas stream. First compressed gas stream 310 can be optionally cooled in any suitable heat exchange unit that can lower the temperature of the first compressed gas stream as necessary to promote the condensation of the aromatic hydrocarbons in first compressed gas stream 310.

Second separator 350 can comprise any suitable vapor-liquid separator that can separate condensed aromatic hydrocarbons from first compressed gas stream 310, the cooled first compressed gas stream, or both. In some aspects, second separator 350 can comprise any suitable vapor-liquid separator that was described previously herein for first separator 200. Second separator 350 can operate at a pressure of from about 20 psig (138 kPag) to about 200 psig (1,379 kPag), alternatively from about 25 psig (172 kPag) to about 175 psig (1,207 kPag), or alternatively from about 50 psig (345 kPag) to about 150 psig (1,034 kPag).

Second liquid stream 370 can be collected as a bottoms stream at a bottom of second separator 350. Second liquid stream 370 can comprise benzene in an amount of equal to or greater than about 1 mol %, alternatively equal to or greater than about 5 mol %, or alternatively equal to or greater than about 10 mol %.

Recycle gas stream 360 can be collected as an overhead stream at a top of second separator 350. Recycle gas stream 360 can comprise hydrogen in an amount of equal to or greater than about 1 mol %, alternatively equal to or greater than about 5 mol %, or alternatively equal to or greater than about 10 mol %.

The method of processing one or more streams in a benzene production system, such as benzene production systems as illustrated in FIGS. 1-3, can comprise recycling at least a portion of recycle gas stream 360 to aromatization reactor system 100. In an aspect, recycle gas stream 360 can be dried prior to recycling to aromatization reactor system 100. Recycle gas stream 360 can be recycled to feed stream 110 prior to purifying feed stream 110, subsequent to purifying feed stream 110, or both. When multiple aromatization reactors are used as part of aromatization reactor system 100, recycle gas stream 360 can be recycled to any of the aromatization reactor feed streams.

The method of processing one or more streams in a benzene production system, such as benzene production systems as illustrated in FIGS. 1-3, can comprise introducing second portion 258 of the first gas stream into a second compressor 400 to produce a second compressed gas stream 410.

Second compressor 400 can comprise any suitable gas compressor that can increase the pressure of second portion 258 of the first gas stream as required by the process. In some aspects, second compressor 400 can comprise any suitable gas compressor that was described previously herein for first compressor 300. Second compressed gas stream 410 emitted from second compressor 400 can be characterized by a pressure of from about 20 psig (138 kPag) to about 200 psig (1,279 kPag), alternatively from about 25 psig (172 kPag) to about 175 psig (1,207 kPag), or alternatively from about 50 psig (345 kPag) to about 150 psig (1,034 kPag). As will be appreciated by one of skill in the art, and with the help of this disclosure, the composition of the first gas stream is not affected by compressing it, and as such the composition of the second compressed gas stream is the same as the composition of the first gas stream (e.g., second portion 258 of the first gas stream). Further, as will be appreciated by one of skill in the art, and with the help of this disclosure, compressing second portion 258 of the first gas stream enables the aromatic hydrocarbons in second portion 258 of the first gas stream to condense at a higher temperature than without the compressing step, which means that a subsequent cooling step will have to cool the compressed gas less to achieve hydrocarbon condensation.

The method of processing one or more streams in a benzene production system, such as benzene production systems as illustrated in FIGS. 1 and 2, can comprise introducing at least a portion of second compressed gas stream 410 into a third separator 450 to produce a third gas stream or gas product stream 460 and a third liquid stream 470, wherein third gas stream 460 comprises hydrogen, and wherein third liquid stream 470 comprises benzene.

Third liquid stream 470 can comprise aromatization reaction products (e.g., aromatic compounds such as benzene, and non-aromatic compounds), in addition to any unreacted feed and other hydrocarbon compounds or byproducts. Third liquid stream 470 can be further sent to a purification-extraction process for enhancing the benzene content, as will be described in more detail later herein.

Second compressed gas stream 410 can be optionally cooled to produce a cooled second compressed gas stream prior to introducing into third separator 450. Cooling the second compressed gas stream can promote the condensation of aromatic hydrocarbons and enable subsequent removal of aromatic hydrocarbons from the second compressed gas stream. As will be appreciated by one of skill in the art, and with the help of this disclosure, the composition of the second compressed gas stream is not affected by cooling it, and as such the composition of the cooled second compressed gas stream is the same as the composition of the second compressed gas stream, although some of the components (e.g., aromatic hydrocarbons) might change the phase they are present in, for example a component might change from a gas phase in the second compressed gas stream to a vapor or liquid phase in the cooled second compressed gas stream. Second compressed gas stream 410 can be optionally cooled in any suitable heat exchange unit that can lower the temperature of the second compressed gas stream as necessary to promote the condensation of the aromatic hydrocarbons in second compressed gas stream 410.

Third separator 450 can comprise any suitable vapor-liquid separator that can separate condensed aromatic hydrocarbons from second compressed gas stream 410, the cooled second compressed gas stream, or both. In some aspects, third separator 450 can comprise any suitable vapor-liquid separator that was described previously herein for first separator 200. Third separator 450 can operate at a pressure of from about 100 psig (689 kPag) to about 400 psig (2,758 kPag), alternatively from about 110 psig (758 kPag) to about 375 psig (2,586 kPag), or alternatively from about 120 psig (827 kPag) to about 350 psig (2,413 kPag).

Third liquid stream 470 can be collected as a bottoms stream at a bottom of third separator 450. Third liquid stream 470 can comprise benzene in an amount of equal to or greater than about 1 mol %, alternatively equal to or greater than about 5 mol %, or alternatively equal to or greater than about 10 mol %.

Gas product stream 460 can be collected as an overhead stream at a top of third separator 450. Gas product stream 460 can comprise hydrogen in an amount of equal to or greater than about 1 mol %, alternatively equal to or greater than about 5 mol %, or alternatively equal to or greater than about 10 mol %.

The method of processing one or more streams in a benzene production system, such as benzene production system 1001 as illustrated in FIG. 1, can comprise optionally recycling a portion 465 of gas product stream 460 to aromatization reactor system 100. In an aspect, portion 465 of gas product stream 460 can be dried prior to recycling to aromatization reactor system 100. Portion 465 of gas product stream 460 can be recycled to feed stream 110 prior to purifying feed stream 110, subsequent to purifying feed stream 110, or both. When multiple aromatization reactors are used as part of aromatization reactor system 100, portion 465 of gas product stream 460 can be recycled to any of the aromatization reactor feed streams. Portion 465 of gas product stream 460 can be used as a back-up stream and/or supplemental stream for recycle gas stream 360.

The method of processing one or more streams in a benzene production system, such as benzene production systems as illustrated in FIGS. 1 and 2, can comprise introducing at least a portion of gas product stream 460 into a third compressor 500 to produce a third compressed gas stream 510.

Third compressor 500 can comprise any suitable gas compressor that can increase the pressure of gas product stream 460 as required by the process. In some aspects, third compressor 500 can comprise any suitable gas compressor that was described previously herein for first compressor 300. Gas product stream 460 can be characterized by a pressure of from about 100 psig (689 kPag) to about 400 psig (2,758 kPag), alternatively from about 110 psig (758 kPag) to about 375 psig (2,586 kPag), or alternatively from about 120 psig (827 kPag) to about 350 psig (2,413 kPag). Third compressed gas stream 510 emitted from third compressor 500 can be characterized by a pressure of from about 300 psig (2,068 kPag) to about 1,000 psig (6,895 kPag), alternatively from about 350 psig (2,413 kPag) to about 950 psig (6,550 kPag), or alternatively from about 400 psig (2,758 kPag) to about 900 psig (6,205 kPag). As will be appreciated by one of skill in the art, and with the help of this disclosure, the composition of the gas product stream is not affected by compressing it, and as such the composition of the third compressed gas stream is the same as the composition of the gas product stream. Further, as will be appreciated by one of skill in the art, and with the help of this disclosure, compressing the gas product stream enables the aromatic hydrocarbons in the gas product stream to condense at a higher temperature than without the compressing step, which means that a subsequent cooling step will have to cool the compressed gas less to achieve hydrocarbon condensation.

The method of processing one or more streams in a benzene production system, such as benzene production systems as illustrated in FIGS. 1 and 2, can comprise introducing at least a portion of third compressed gas stream 510 into a fourth separator 550 to produce a fourth gas stream or purified gas product stream 560 and a fourth liquid stream 570, wherein fourth gas stream 560 comprises hydrogen, and wherein fourth liquid stream 570 comprises benzene.

Fourth liquid stream 570 can comprise aromatization reaction products (e.g., aromatic compounds such as benzene, and non-aromatic compounds), in addition to any unreacted feed and other hydrocarbon compounds or byproducts. Fourth liquid stream 570 can be further sent to a purification-extraction process for enhancing the benzene content, as will be described in more detail later herein.

Third compressed gas stream 510 can be optionally cooled to produce a cooled third compressed gas stream prior to introducing the stream into fourth separator 550. Cooling the third compressed gas stream can promote the condensation of aromatic hydrocarbons and enable subsequent removal of aromatic hydrocarbons from the third compressed gas stream. As will be appreciated by one of skill in the art, and with the help of this disclosure, the composition of the third compressed gas stream is not affected by cooling it, and as such the composition of the cooled third compressed gas stream is the same as the composition of the third compressed gas stream, although some of the components (e.g., aromatic hydrocarbons) might change the phase they are present in, for example a component might change from a gas phase in the third compressed gas stream to a vapor or liquid phase in the cooled third compressed gas stream. Third compressed gas stream 510 can be optionally cooled in any suitable heat exchange unit that can lower the temperature of the second compressed gas stream as necessary to promote the condensation of the aromatic hydrocarbons in third compressed gas stream 510.

Fourth separator 550 can comprise any suitable vapor-liquid separator that can separate condensed aromatic hydrocarbons from third compressed gas stream 510, the cooled third compressed gas stream, or both. In some aspects, fourth separator 550 can comprise any suitable vapor-liquid separator that was described previously herein for first separator 200. Fourth separator 550 can operate at a pressure of from about 300 psig (2,068 kPag) to about 1,000 psig (6,895 kPag), alternatively from about 350 psig (2,413 kPag) to about 950 psig (6,550 kPag), or alternatively from about 400 psig (2,758 kPag) to about 900 psig (6,205 kPag).

Fourth liquid stream 570 can be collected as a bottoms stream at a bottom of fourth separator 550. Fourth liquid stream 570 can comprise benzene in an amount of equal to or greater than about 1 mol %, alternatively equal to or greater than about 5 mol %, or alternatively equal to or greater than about 10 mol %.

Purified gas product stream 560 can be collected as an overhead stream at a top of fourth separator 550. Purified gas product stream 560 can comprise hydrogen in an amount of equal to or greater than about 0.1 mol %, alternatively equal to or greater than about 1 mol %, or alternatively equal to or greater than about 10 mol %. Purified gas product stream 560 can be characterized by a pressure of from about 300 psig (2,068 kPag) to about 1,000 psig (6,895 kPag), alternatively from about 350 psig (2,413 kPag) to about 950 psig (6,550 kPag), or alternatively from about 400 psig (2,758 kPag) to about 900 psig (6,205 kPag). Purified gas product stream 560 comprises hydrogen, and as such purified gas product stream 560 or any portion thereof (e.g., first portion 566 of the purified gas product stream, second portion 568 of the purified gas product stream) can be used as a source of hydrogen or fuel gas for other applications.

In an alternative configuration, the method of processing one or more streams in a benzene production system, such as benzene production systems as illustrated in FIGS. 1 and 2, can comprise introducing at least a portion of purified gas product stream 560 into a gas splitter 561 to produce a first portion 566 of the purified gas product stream and a second portion 568 of the purified gas product stream. Gas splitter 561 can comprise any suitable gas splitter, such as for example a gas splitter valve. First portion 566 of the purified gas product stream can comprise from about 0% to about 100%, alternatively from about 10% to about 90%, or alternatively from about 25% to about 75% of purified gas product stream 560. Second portion 568 of the purified gas product stream can comprise from about 0% to about 100%, alternatively from about 10% to about 90%, or alternatively from about 25% to about 75% of purified gas product stream 560. As will be appreciated by one of skill in the art, and with the help of this disclosure, a sum of first portion 566 of the purified gas product stream and second portion 568 of purified gas product stream equals 100% of purified gas product stream 560.

The method of processing one or more streams in a benzene production system, such as benzene production system 1002 as illustrated in FIG. 2, can comprise optionally recycling a portion 567 (e.g., first portion 566) of purified gas product stream 560 to aromatization reactor system 100. In an aspect, portion 567 of purified gas product stream 560 can be dried prior to recycling to aromatization reactor system 100. In another aspect, portion 567 of purified gas product stream 560 can be introduced to a pressure reducing valve prior to optionally recycling portion 567 of purified gas product stream 560 to aromatization reactor system 100. The purified gas product stream recovered from the pressure reducing valve can be characterized by a pressure of from about 100 psig (689 kPag) to about 900 psig (6,205 kPag), alternatively from about 110 psig (758 kPag) to about 800 psig (5,516 kPag), or alternatively from about 120 psig (827 kPag) to about 750 psig (5,171 kPag). In some aspects, the entire first portion 566 of purified gas product stream can be recycled to aromatization reactor system 100. In other aspects, only a portion 567 of first portion 566 of purified gas product stream can be recycled to aromatization reactor system 100; wherein any remaining portion of first portion 566 of purified gas product stream can be stored for further use, or used as a source of hydrogen or fuel gas for other applications.

Portion 567 of purified gas product stream 560 can be recycled to feed stream 110 prior to purifying feed stream 110, subsequent to purifying feed stream 110, or both. When multiple aromatization reactors are used as part of aromatization reactor system 100, portion 567 of purified gas product stream 560 can be recycled to any of the aromatization reactor feed streams. Portion 567 of purified gas product stream 560 can be used as a back-up stream and/or supplemental stream for recycle gas stream 360.

In an alternative configuration, the method of processing one or more streams in a benzene production system, such as benzene production system 2000 as illustrated in FIG. 3, can comprise introducing at least a portion of first compressed gas stream 310 and at least a portion of second compressed gas stream 410 into second separator 350 to produce second gas stream 360 (e.g., recycle gas stream) and second liquid stream 370.

Referring to FIG. 3, first portion 256 of the first gas stream can comprise from about 50% to about 100%, alternatively from about 60% to about 95%, or alternatively from about 75% to about 90% of first gas stream 210. Second portion 258 of the first gas stream can comprise about 50% to about 100%, alternatively from about 60% to about 95%, or alternatively from about 75% to about 90% of first gas stream 210.

The method of processing one or more streams in a benzene production system, such as benzene production system 2000 as illustrated in FIG. 3, can comprise introducing at least a portion of second gas stream 360 into gas splitter 361 to produce first portion 366 of the second gas stream and second portion 368 of the second gas stream. Gas splitter 361 can comprise any suitable gas splitter, such as for example a gas splitter valve. First portion 366 of the second gas stream can comprise from about 0% to about 100%, alternatively from about 10% to about 90%, or alternatively from about 25% to about 75% of second gas stream 360. Second portion 368 of the second gas stream can comprise from about 0% to about 100%, alternatively from about 10% to about 90%, or alternatively from about 25% to about 75% of second gas stream 360. As will be appreciated by one of skill in the art, and with the help of this disclosure, a sum of first portion 366 of the second gas stream and second portion 368 of the second gas stream equals 100% of second gas stream 360.

The method of processing one or more streams in a benzene production system, such as benzene production system 2000 as illustrated in FIG. 3, can comprise optionally recycling at least portion 367 (e.g., first portion 366) of second gas stream 360 to aromatization reactor system 100. In an aspect, portion 367 of second gas stream 360 can be dried prior to recycling to aromatization reactor system 100. In some aspects, the entire first portion 366 of second gas stream 360 can be recycled to aromatization reactor system 100. In other aspects, only a portion 367 of first portion 366 of second gas stream 360 can be recycled to aromatization reactor system 100; wherein any remaining portion of first portion 366 of second gas stream 360 can be stored for further use, or used as a source of hydrogen or fuel gas for other applications.

Portion 367 of first portion 366 of the second gas stream can be recycled to feed stream 110 prior to purifying feed stream 110, subsequent to purifying feed stream 110, or both. When multiple aromatization reactors are used as part of aromatization reactor system 100, portion 367 of first portion 366 of the second gas stream can be recycled to any of the aromatization reactor feed streams. Portion 367 of first portion 366 of the second gas stream can be used as recycle gas stream to aromatization reactor system 100.

Referring to FIG. 3, first compressor 300 and second compressor 400 can be the same or different. In some configurations of FIG. 3, first compressor 300 and second compressor 400 can be different. For example, first compressor 300 can be a steam driven compressor, and second compressor 400 can be an electric driven compressor. As another example, first compressor 300 can be an electric driven compressor, and second compressor 400 can be a steam driven compressor.

Second portion 368 of second gas stream 360 can be further processed in a manner similar to processing second portion 258 of first gas stream 210 in FIGS. 1 and/or 2, as previously described herein, by introducing second portion 368 of second gas stream 360 into one or more compressors and one or more separators.

The method of processing one or more streams in a benzene production system as disclosed herein can further comprise combining all or a portion of first liquid stream 220, second liquid stream 370, third liquid stream 470, fourth liquid stream 570, or combinations thereof to produce a liquid product 600, wherein liquid product 600 comprises benzene in an amount of equal to or greater than about 20 wt. %, alternatively equal to or greater than about 30 wt. %, or alternatively equal to or greater than about 40 wt. %, based on the total weight of liquid product 600.

Liquid product 600 can be further subjected to a purification process (e.g., purification-extraction process) to produce a benzene product 650, wherein benzene product 650 comprises benzene in an amount of equal to or greater than about 98 wt. %, alternatively equal to or greater than about 99 wt. %, alternatively equal to or greater than about 99.8 wt. %, based on the total weight of benzene product 650. Benzene product 650 can be sold or otherwise used as desired.

The purification process for producing benzene product 650 can comprise introducing liquid product 600 into an extraction unit to produce an aromatic extract stream (e.g., benzene product 650) and a non-aromatic stream. The extraction unit can comprise any suitable extraction unit for separating aromatics from non-aromatics. Generally, the extraction can be either a liquid/liquid extraction (for example, using sulfolane as the solvent) or an extractive distillation. Extractive distillation technology can be used for recovering a high purity benzene product 650 from liquid product 600 by using N-methyl pyrrolidone as a solvent. Another extractive distillation process can employ N-substituted morpholines as the extractive distillation solvent.

An extraction unit for producing benzene product 650 can comprise an extractive distillation unit using a N-formyl-morpholine solvent. Such a unit could employ an extractive distillation column and a stripper column. The extractive distillation column can contact liquid product 600 with the N-formylmorpholine solvent, thus suppressing the boiling point of the aromatics and allowing the non-aromatics to be taken overhead. The stripper column can then separate the remaining aromatics from the N-formylmorpholine solvent using simple distillation. The non-aromatic stream recovered from the extraction process can be recycled to aromatization reactor system 100. In an aspect, the non-aromatic stream can be dried prior to being recycled to aromatization reactor system 100. The non-aromatic stream can be recycled to feed stream 110 prior to purifying feed stream 110, subsequent to purifying feed stream 110, or both. When multiple aromatization reactors are used as part of aromatization reactor system 100, the non-aromatic stream can be recycled to any of the aromatization reactor feed streams.

The various embodiments shown in FIGS. 1-3 can be simplified and may not illustrate common equipment such as heat exchangers, pumps, and compressors; however, a skilled artisan would recognize the disclosed processes and systems can include such equipment commonly used throughout benzene manufacturing.

According to the present disclosure, and as illustrated in FIG. 1, a method of processing one or more streams in a benzene production system 1001 can generally comprise the steps of (a) introducing feed stream 110 into aromatization reactor system 100 to produce reactor effluent stream 120, wherein reactor effluent stream 120 comprises benzene; (b) introducing at least a portion of reactor effluent stream 120 into first separator 200 to produce first gas stream 210 and first liquid stream 220, wherein first separator 200 operates at a pressure of from about 25 psig (172 kPag) to about 75 psig (517 kPag); (c) splitting first gas stream 210 in gas splitter 250 into first portion 256 of the first gas stream and second portion 258 of the first gas stream; (d) introducing first portion 256 of the first gas stream into first compressor 300 to produce first compressed gas stream 310; (e) introducing at least a portion of first compressed gas stream 310 into second separator 350 to produce recycle gas stream 360 and second liquid stream 370, wherein recycle gas stream 360 comprises hydrogen in an amount of equal to or greater than about 1 mol %, and wherein second separator 350 operates at a pressure of from about 50 psig (345 kPag) to about 150 psig (1,034 kPag); (f) recycling at least a portion of recycle gas stream 360 to aromatization reactor system 100; (g) introducing second portion 258 of the first gas stream into second compressor 400 to produce second compressed gas stream 410; (h) introducing at least a portion of second compressed gas stream 410 into third separator 450 to produce gas product stream 460 and third liquid stream 470, wherein gas product stream 460 comprises hydrogen in an amount of equal to or greater than about 1 mol %, and wherein third separator 450 operates at a pressure of from about 100 psig (689 kPag) to about 350 psig (2,413 kPag); (i) optionally recycling at least a portion 465 of gas product stream 460 to aromatization reactor system 100; (j) introducing at least a portion of gas product stream 460 to third compressor 500 to produce third compressed gas stream 510; and (k) introducing at least a portion of third compressed gas stream 510 into fourth separator 550 to produce purified gas product stream 560 and fourth liquid stream 570, wherein purified gas product stream 560 comprises hydrogen in an amount of equal to or greater than about 1 mol %, and wherein fourth separator 550 operates at a pressure of from about 300 psig (2,068 kPag) to about 900 psig (6,205 kPag). Referring to FIG. 1, first liquid stream 220, second liquid stream 370, third liquid stream 470, fourth liquid stream 570, or combinations thereof can be further subjected to a purification process (e.g., purification-extraction process) to produce benzene product 650, wherein benzene product 650 comprises benzene in an amount of equal to or greater than about 99.8 wt. %, based on the total weight of benzene product 650.

According to the present disclosure, and as illustrated in FIG. 2, a method of processing one or more streams in benzene production system 1002 can generally comprise the steps of (a) introducing feed stream 110 to aromatization reactor system 100 to produce reactor effluent stream 120, wherein reactor effluent stream 120 comprises benzene; (b) introducing at least a portion of reactor effluent stream 120 into first separator 200 to produce first gas stream 210 and first liquid stream 220, wherein first separator 200 operates at a pressure of from about 25 psig (172 kPag) to about 75 psig (517 kPag); (c) splitting first gas stream 210 in gas splitter 250 into first portion 256 of the first gas stream and second portion 258 of the first gas stream; (d) introducing first portion 256 of the first gas stream into first compressor 300 to produce first compressed gas stream 310; (e) introducing at least a portion of first compressed gas stream 310 into second separator 350 to produce recycle gas stream 360 and second liquid stream 370, wherein recycle gas stream 360 comprises hydrogen in an amount of equal to or greater than about 1 mol %, and wherein second separator 350 operates at a pressure of from about 50 psig (345 kPag) to about 150 psig (1,034 kPag); (f) recycling at least a portion of recycle gas stream 360 to aromatization reactor system 100; (g) introducing second portion 258 of the first gas stream into second compressor 400 to produce second compressed gas stream 410; (h) introducing at least a portion of second compressed gas stream 410 into third separator 450 to produce gas product stream 460 and third liquid stream 470, wherein gas product stream 460 comprises hydrogen in an amount of equal to or greater than about 1 mol %, and wherein third separator 450 operates at a pressure of from about 100 psig (689 kPag) to about 350 psig (2,413 kPag); (i) introducing at least a portion of gas product stream 460 into third compressor 500 to produce third compressed gas stream 510; (j) introducing at least a portion of third compressed gas stream 510 into fourth separator 550 to produce purified gas product stream 560 and fourth liquid stream 570, wherein purified gas product stream 560 comprises hydrogen in an amount of equal to or greater than about 1 mol %, and wherein fourth separator 550 operates at a pressure of from about 300 psig (2,068 kPag) to about 900 psig (6,205 kPag); (k) splitting purified gas product stream 560 in splitter 561 into first portion 566 of the purified gas product stream and second portion 568 of the purified gas product stream; and (l) optionally recycling at least a portion 567 of first portion 566 of the purified gas product stream to aromatization reactor system 100. Referring to FIG. 2, first liquid stream 220, second liquid stream 370, third liquid stream 470, fourth liquid stream 570, or combinations thereof can be further subjected to a purification process (e.g., purification-extraction process) to produce benzene product 650, wherein benzene product 650 comprises benzene in an amount of equal to or greater than about 99.8 wt. %, based on the total weight of benzene product 650. First portion 566 of the purified gas product stream can be introduced to a pressure reducing valve prior to the step (l) of optionally recycling at least a portion 567 of first portion 566 of the purified gas product stream to aromatization reactor system 100.

According to the present disclosure, and as illustrated in FIG. 3, a method of processing one or more streams in benzene production system 2000 can generally comprise the steps of (a) introducing feed stream 110 to aromatization reactor system 100 to produce reactor effluent stream 120, wherein reactor effluent stream 120 comprises benzene; (b) introducing at least a portion of reactor effluent stream 120 into first separator 200 to produce first gas stream 210 and first liquid stream 220, wherein first separator 200 operates at a pressure of from about 25 psig (172 kPag) to about 75 psig (517 kPag); (c) splitting first gas stream 210 in gas splitter 250 into first portion 256 of the first gas stream and second portion 258 of the first gas stream; (d) introducing first portion 256 of the first gas stream into first compressor 300 to produce first compressed gas stream 310; (e) introducing second portion 258 of the first gas stream into second compressor 400 to produce second compressed gas stream 410; (f) introducing at least a portion of first compressed gas stream 310 and at least a portion of second compressed gas stream 410 into second separator 350 to produce second gas stream (e.g., recycle gas stream) 360 and second liquid stream 370, wherein second gas stream 360 comprises hydrogen in an amount of equal to or greater than about 1 mol %, and wherein second separator 350 operates at a pressure of from about 50 psig (345 kPag) to about 150 psig (1,034 kPag); (g) splitting second gas stream 360 in gas splitter 361 into first portion 366 of the second gas stream and second portion 368 of the second gas stream; and (h) recycling at least a portion 367 of first portion 366 of the second gas stream to aromatization reactor system 100. Referring to FIG. 3, first liquid stream 220 and/or second liquid stream 370 can be further subjected to a purification process (e.g., purification-extraction process) to produce benzene product 650, wherein benzene product 650 comprises benzene in an amount of equal to or greater than about 99.8 wt. %, based on the total weight of benzene product 650.

One or more of the disclosed systems (e.g., benzene production system 1001, benzene production system 1002, benzene production system 2000), methods, or both can advantageously display improvements in one or more system characteristics, method characteristics, or both when compared to otherwise similar systems, methods, or both used in conventional processes for the production of benzene. The method of processing one or more streams in a benzene production system as disclosed herein can advantageously prevent shutting down the benzene production system in case of failure of one of the compressors, as other compressors can pick up the compressor feed and provide for a recycle stream comprising hydrogen to aromatization reactor system 100. The method of processing one or more streams in a benzene production system as disclosed herein can advantageously allow for maintenance of the compressors, as other compressors can pick up the compressor feed and provide for a recycle stream comprising hydrogen to aromatization reactor system 100. The method of processing one or more streams in a benzene production system as disclosed herein can advantageously allow for increasing benzene production capacity. Additional advantages of the systems, methods, or both for the production of benzene as disclosed herein can be apparent to one of skill in the art viewing this disclosure.

For the purpose of any U.S. national stage filing from this application, all publications and patents mentioned in this disclosure are incorporated herein by reference in their entireties, for the purpose of describing and disclosing the constructs and methodologies described in those publications, which might be used in connection with the methods of this disclosure. Any publications and patents discussed herein are provided solely for their disclosure prior to the filing date of the present application. Nothing herein is to be construed as an admission that the inventors are not entitled to antedate such disclosure by virtue of prior invention.

The present disclosure is further illustrated by the following examples, which are not to be construed in any way as imposing limitations upon the scope thereof. On the contrary, it is to be clearly understood that resort can be had to various other aspects, embodiments, modifications, and equivalents thereof which, after reading the description herein, can be suggest to one of ordinary skill in the art without departing from the spirit of the present invention or the scope of the appended claims.

ADDITIONAL DISCLOSURE

The following enumerated embodiments are provided as nonlimiting examples.

A first aspect, which is a method of processing one or more streams in a benzene production system, the method comprising (a) receiving a reactor effluent stream from an aromatization reactor system, wherein the reactor effluent comprises benzene; (b) introducing at least a portion of the reactor effluent stream into a first separator to produce a first gas stream and a first liquid stream; (c) splitting the first gas stream into a first portion of the first gas stream and a second portion of the first gas stream; (d) introducing the first portion of the first gas stream into a first compressor to produce a first compressed gas stream; (e) introducing at least a portion of the first compressed gas stream into a second separator to produce a recycle gas stream and a second liquid stream, wherein the recycle gas stream comprises hydrogen; (f) recycling at least a portion of the recycle gas stream to the aromatization reactor system; (g) introducing the second portion of the first gas stream into a second compressor to produce a second compressed gas stream; (h) introducing at least a portion of the second compressed gas stream into a third separator to produce a gas product stream and a third liquid stream, wherein the gas product stream comprises hydrogen; and (i) optionally recycling a portion of the gas product stream to the aromatization reactor system.

A second aspect, which is the method of the first aspect, wherein the recycle gas comprises hydrogen in an amount of equal to or greater than about 1 mol %.

A third aspect, which is the method of any one of the first and the second aspects, wherein the gas product comprises hydrogen in an amount of equal to or greater than about 1 mol %.

A fourth aspect, which is the method of any one of the first through the third aspects, wherein the first liquid stream comprises benzene in an amount of equal to or greater than about 1 mol %.

A fifth aspect, which is the method of any one of the first through the fourth aspects, wherein the second compressor comprises a reciprocating compressor, a screw compressor, a rotary-screw compressor, an oil-free rotary-screw compressor, an oil-injected rotary-screw compressor, a centrifugal compressor, an axial-flow compressor, or combinations thereof.

A sixth aspect, which is the method of any one of the first through the fifth aspects, wherein the step (c) of splitting the first gas stream into a first portion of the first gas stream and a second portion of the first gas stream is carried out by a splitter.

A seventh aspect, which is the method of the sixth aspect, wherein the splitter comprises a gas splitter valve.

An eighth aspect, which is the method of any one of the first through the seventh aspects further comprising (i) introducing a portion of the gas product stream into a third compressor to produce a third compressed gas stream; and (ii) introducing at least a portion of the third compressed gas stream into a fourth separator to produce a purified gas product stream and a fourth liquid stream.

A ninth aspect, which is the method of the eighth aspect further comprising (1) combining all or a portion of the first liquid stream, the second liquid stream, the third liquid stream, the fourth liquid stream, or combinations thereof to produce a liquid product, wherein the liquid product comprises benzene in an amount of equal to or greater than about 40 wt. %, based on the total weight of the liquid product; and (2) subjecting the liquid product to a purification process to produce a benzene product, wherein the benzene product comprises benzene in an amount of equal to or greater than about 98 wt. %, based on the total weight of the benzene product.

A tenth aspect, which is the method of any one of the first through the ninth aspects further comprising (iii) splitting the purified gas product stream into a first portion of the purified gas product stream and a second portion of the purified gas product stream; and (iv) optionally recycling at least a portion of the first portion of the purified gas product stream to the aromatization reactor system.

An eleventh aspect, which is the method of the tenth aspect, wherein the step (iii) of splitting the purified gas product stream into a first portion of the purified gas product stream and a second portion of the purified gas product stream is carried out by a splitter.

A twelfth aspect, which is the method of the eleventh aspect, wherein the splitter comprises a gas splitter valve.

A thirteenth aspect, which is the method of any one of the first through the twelfth aspects, wherein the first separator operates at a pressure of from about 0 psig to about 100 psig (689 kPag).

A fourteenth aspect, which is the method of any one of the first through the thirteenth aspects, wherein the second separator operates at a pressure of from about 20 psig (138 kPag) to about 200 psig (138 kPag).

A fifteenth aspect, which is the method of any one of the first through the fourteenth aspects, wherein the third separator operates at a pressure of from about 100 psig (689 kPag) to about 400 psig (2,758 kPag).

A sixteenth aspect, which is the method of any one of the first through the fifteenth aspects, wherein the fourth separator operates at a pressure of from about 300 psig (2,068 kPag) to about 1,000 psig (6,895 kPag).

A seventeenth aspect, which is the method of any one of the first through the sixteenth aspects, wherein the first portion of the first gas stream comprises from about 0% to about 100% of the first gas stream.

An eighteenth aspect, which is the method of any one of the first through the seventeenth aspects, wherein the second portion of the first gas stream comprises from about 0% to about 100% of the first gas stream.

A nineteenth aspect, which is a method of processing one or more streams in a benzene production system, the method comprising (a) receiving a reactor effluent stream from an aromatization reactor system, wherein the reactor effluent comprises benzene; (b) introducing at least a portion of the reactor effluent stream into a first separator to produce a first gas stream and a first liquid stream; (c) splitting the first gas stream into a first portion of the first gas stream and a second portion of the first gas stream; (d) introducing the first portion of the first gas stream into a first compressor to produce a first compressed gas stream; (e) introducing at least a portion of the first compressed gas stream into a second separator to produce a recycle gas stream and a second liquid stream; (f) recycling at least a portion of the recycle gas stream to the aromatization reactor system; (g) introducing the second portion of the first gas stream into a second compressor to produce a second compressed gas stream; (h) introducing at least a portion of the second compressed gas stream into a third separator to produce a third gas stream and a third liquid stream; (i) introducing at least a portion of the third gas stream into a third compressor to produce a third compressed gas stream; (j) introducing at least a portion of the third compressed gas stream into a fourth separator to produce a purified gas product stream and a fourth liquid stream, wherein the purified gas product stream comprises hydrogen; (k) splitting the purified gas product stream into a first portion of the purified gas product stream and a second portion of the purified gas product stream; and (l) optionally recycling at least a portion of the first portion of the purified gas product stream to the aromatization reactor system.

A twentieth aspect, which is the method of the nineteenth aspect, wherein the second compressor and/or the third compressor are reciprocating compressors, screw compressors, rotary-screw compressors, oil-free rotary-screw compressors, oil-injected rotary-screw compressors, centrifugal compressors, axial-flow compressors, or combinations thereof.

A twenty-first aspect, which is the method of any one of the nineteenth and the twentieth aspects, wherein the purified gas product stream is characterized by a pressure of from about 300 psig (2,068 kPag) to about 1,000 psig (6,895 kPag).

A twenty-second aspect, which is the method of any one of the nineteenth through the twenty-first aspects, wherein a portion of the purified gas product stream is introduced to a pressure reducing valve prior to the step (l) of optionally recycling at least a portion of the first portion of the purified gas product stream to the aromatization reactor system.

A twenty-third aspect, which is the method of the twenty-second aspect, wherein a purified gas product stream recovered from the pressure reducing valve is characterized by a pressure of from about 150 psig (1,034 kPag) to about 900 psig (6,205 kPag).

A twenty-fourth aspect, which is the method of any one of the nineteenth through the twenty-third aspects, wherein the purified gas product stream comprises hydrogen in an amount of equal to or greater than about 1 mol %.

A twenty-fifth aspect, which is the method of any one of the nineteenth through the twenty-fourth aspects, wherein the step (c) of splitting the first gas stream into a first portion of the first gas stream and a second portion of the first gas stream is carried out by a first splitter; and wherein the step (k) of splitting the purified gas product stream into a first portion of the purified gas product stream and a second portion of the purified gas product stream is carried out by a second splitter.

A twenty-sixth aspect, which is the method of the twenty-fifth aspect, wherein the first splitter, the second splitter or both comprise a gas splitter valve.

A twenty-seventh aspect, which is a method of processing one or more streams in a benzene production system, the method comprising (a) receiving a reactor effluent stream from an aromatization reactor system, wherein the reactor effluent comprises benzene; (b) introducing at least a portion of the reactor effluent stream into a first separator to produce a first gas stream and a first liquid stream; (c) splitting the first gas stream into a first portion of the first gas stream and a second portion of the first gas stream; (d) introducing the first portion of the first gas stream into a first compressor to produce a first compressed gas stream; (e) introducing the second portion of the first gas stream into a second compressor to produce a second compressed gas stream; (f) introducing at least a portion of the first compressed gas stream and/or at least a portion of the second compressed gas stream into a second separator to produce a second gas stream and a second liquid stream, wherein the second gas stream comprises hydrogen; and (g) recycling a portion of the second gas stream to the aromatization reactor system.

A twenty-eighth aspect, which is the method of the twenty-seventh aspect, wherein the first compressor and the second compressor are different.

A twenty-ninth aspect, which is the method of any one of the twenty-seventh and the twenty-eighth aspects, wherein the first compressor is a steam driven compressor.

A thirtieth aspect, which is the method of any one of the twenty-seventh through the twenty-ninth aspects, wherein the second compressor is an electric driven compressor.

A thirty-first aspect, which is the method of any one of the twenty-seventh through the thirtieth aspects, wherein the first portion of the first gas stream comprises from about 50% to about 100% of the first gas stream.

A thirty-second aspect, which is the method of any one of the twenty-seventh through the thirty-first aspects, wherein the second portion of the first gas stream comprises from about 50% to about 100% of the first gas stream.

A thirty-third aspect, which is the method of any one of the twenty-seventh through the thirty-second aspects, wherein the step (c) of splitting the first gas stream into a first portion of the first gas stream and a second portion of the first gas stream is carried out by a splitter.

A thirty-fourth aspect, which is the method of the thirty-third aspect, wherein the splitter comprises a gas splitter valve.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention. At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, and the like; greater than 0.10 includes 0.11, 0.12, 0.13, and the like). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A method of processing one or more streams in a benzene production system, the method comprising:
    (a) receiving a reactor effluent stream from an aromatization reactor system, wherein the reactor effluent comprises benzene;
    (b) introducing at least a portion of the reactor effluent stream into a first separator to produce a first gas stream and a first liquid stream;
    (c) splitting the first gas stream into a first portion of the first gas stream and a second portion of the first gas stream;
    (d) introducing the first portion of the first gas stream into a first compressor to produce a first compressed gas stream;
    (e) introducing at least a portion of the first compressed gas stream into a second separator to produce a recycle gas stream and a second liquid stream, wherein the recycle gas stream comprises hydrogen;
    (f) recycling at least a portion of the recycle gas stream to the aromatization reactor system;
    (g) introducing the second portion of the first gas stream into a second compressor to produce a second compressed gas stream;
    (h) introducing at least a portion of the second compressed gas stream into a third separator to produce a gas product stream and a third liquid stream, wherein the gas product stream comprises hydrogen; and
    (i) optionally recycling a portion of the gas product stream to the aromatization reactor system.

2. The method of claim 1, wherein the recycle gas comprises hydrogen in an amount of equal to or greater than about 1 mol %.

3. The method of claim 1, wherein the gas product comprises hydrogen in an amount of equal to or greater than about 1 mol %.

4. The method of claim 1, wherein the first liquid stream comprises benzene in an amount of equal to or greater than about 1 mol %.

5. The method of claim 1, wherein the second compressor comprises a reciprocating compressor, a screw compressor, a rotary-screw compressor, an oil-free rotary-screw compressor, an oil-injected rotary-screw compressor, a centrifugal compressor, an axial-flow compressor, or combinations thereof.

6. The method of claim 1 further comprising (i) introducing a portion of the gas product stream into a third compressor to produce a third compressed gas stream; and (ii) introducing at least a portion of the third compressed gas stream into a fourth separator to produce a purified gas product stream and a fourth liquid stream.

7. The method of claim 6 further comprising (1) combining all or a portion of the first liquid stream, the second liquid stream, the third liquid stream, the fourth liquid stream, or combinations thereof to produce a liquid product, wherein the liquid product comprises benzene in an amount of equal to or greater than about 40 wt. %, based on the total weight of the liquid product; and (2) subjecting the liquid product to a purification process to produce a benzene product, wherein the benzene product comprises benzene in an amount of equal to or greater than about 98 wt. %, based on the total weight of the benzene product.

8. The method of claim 1, wherein the first separator operates at a pressure of from about 0 psig to about 100 psig (689 kPag).

9. The method of claim 1, wherein the second separator operates at a pressure of from about 20 psig (138 kPag) to about 200 psig (138 kPag).

10. The method of claim 1, wherein the third separator operates at a pressure of from about 100 psig (689 kPag) to about 400 psig (2,758 kPag).

11. The method of claim 1, wherein the fourth separator operates at a pressure of from about 300 psig (2,068 kPag) to about 1,000 psig (6,895 kPag).

12. The method of claim 1, wherein the second portion of the first gas stream comprises from about 0% to about 100% of the first gas stream.

13. A method of processing one or more streams in a benzene production system, the method comprising:
(a) receiving a reactor effluent stream from an aromatization reactor system, wherein the reactor effluent comprises benzene;
(b) introducing at least a portion of the reactor effluent stream into a first separator to produce a first gas stream and a first liquid stream;
(c) splitting the first gas stream into a first portion of the first gas stream and a second portion of the first gas stream;
(d) introducing the first portion of the first gas stream into a first compressor to produce a first compressed gas stream;
(e) introducing at least a portion of the first compressed gas stream into a second separator to produce a recycle gas stream and a second liquid stream;
(f) recycling at least a portion of the recycle gas stream to the aromatization reactor system;
(g) introducing the second portion of the first gas stream into a second compressor to produce a second compressed gas stream;
(h) introducing at least a portion of the second compressed gas stream into a third separator to produce a third gas stream and a third liquid stream;
(i) introducing at least a portion of the third gas stream into a third compressor to produce a third compressed gas stream;
(j) introducing at least a portion of the third compressed gas stream into a fourth separator to produce a purified gas product stream and a fourth liquid stream, wherein the purified gas product stream comprises hydrogen;
(k) splitting the purified gas product stream into a first portion of the purified gas product stream and a second portion of the purified gas product stream; and
(l) optionally recycling at least a portion of the first portion of the purified gas product stream to the aromatization reactor system.

14. The method of claim 13, wherein the second compressor and/or the third compressor are reciprocating compressors, screw compressors, rotary-screw compressors, oil-free rotary-screw compressors, oil-injected rotary-screw compressors, centrifugal compressors, axial-flow compressors, or combinations thereof.

15. The method of claim 13, wherein the purified gas product stream is characterized by a pressure of from about 300 psig (2,068 kPag) to about 1,000 psig (6,895 kPag).

16. The method of claim 13, wherein a portion of the purified gas product stream is introduced to a pressure reducing valve prior to the step (l) of optionally recycling at least a portion of the first portion of the purified gas product stream to the aromatization reactor system.

17. The method of the claim 16, wherein a purified gas product stream recovered from the pressure reducing valve is characterized by a pressure of from about 150 psig (1,034 kPag) to about 900 psig (6,205 kPag).

18. The method of claim 13, wherein the purified gas product stream comprises hydrogen in an amount of equal to or greater than about 1 mol %.

19. A method of processing one or more streams in a benzene production system, the method comprising:
(a) receiving a reactor effluent stream from an aromatization reactor system, wherein the reactor effluent comprises benzene;
(b) introducing at least a portion of the reactor effluent stream into a first separator to produce a first gas stream and a first liquid stream;
(c) splitting the first gas stream into a first portion of the first gas stream and a second portion of the first gas stream;
(d) introducing the first portion of the first gas stream into a first compressor to produce a first compressed gas stream;
(e) introducing the second portion of the first gas stream into a second compressor to produce a second compressed gas stream;
(f) introducing at least a portion of the first compressed gas stream and/or at least a portion of the second compressed gas stream into a second separator to produce a second gas stream and a second liquid stream, wherein the second gas stream comprises hydrogen; and
(g) recycling a portion of the second gas stream to the aromatization reactor system.

20. The method of claim 19, wherein the first compressor and the second compressor are different.

21. The method of claim 19, wherein the first portion of the first gas stream comprises from about 50% to about 100% of the first gas stream.

* * * * *